United States Patent [19]

Groves

[11] Patent Number: 5,602,202
[45] Date of Patent: Feb. 11, 1997

[54] METHODS OF USING ACRYLATE-CONTAINING POLYMER BLENDS

[75] Inventor: James D. Groves, Hudson, Wis.

[73] Assignee: Minnesota Mining and Manufacturing Company, St. Paul, Minn.

[21] Appl. No.: 493,570

[22] Filed: Jun. 22, 1995

Related U.S. Application Data

[63] Continuation-in-part of Ser. No. 361,058, Dec. 21, 1994, abandoned, which is a continuation-in-part of Ser. No. 182,573, Jan. 14, 1994, abandoned.

[51] Int. Cl.⁶ .......................... B05D 3/00; C09J 125/10; C09J 133/00
[52] U.S. Cl. .................. 525/73; 525/77; 525/78; 525/80; 525/85; 427/208.8; 427/407.1; 156/332
[58] Field of Search ................. 525/73, 74, 77, 525/78, 80; 427/412.3, 412.1, 407.1, 208.4, 208.8

[56] References Cited

U.S. PATENT DOCUMENTS

| | | | |
|---|---|---|---|
| 3,832,274 | 8/1974 | Owston | 428/462 |
| 4,126,504 | 11/1978 | Wolinski et al. | 156/310 |
| 4,243,500 | 1/1981 | Glennon | 204/159 |
| 4,552,921 | 11/1985 | Shyu et al. | 525/96 |
| 4,726,982 | 2/1988 | Traynor et al. | 428/213 |
| 4,994,508 | 2/1991 | Shiraki et al. | 525/74 |
| 5,143,972 | 9/1992 | Groves | 525/71 |
| 5,232,838 | 8/1993 | Nelson et al. | 435/30 |
| 5,234,524 | 8/1993 | Ozu et al. | 156/327 |
| 5,281,663 | 1/1994 | Gelles et al. | 525/64 |

FOREIGN PATENT DOCUMENTS

| | | |
|---|---|---|
| 0044166 | 1/1982 | European Pat. Off. . |
| 0238863 | 9/1987 | European Pat. Off. . |
| 2053238 | 2/1981 | United Kingdom . |

*Primary Examiner*—Mark Warzel
*Attorney, Agent, or Firm*—Gary L. Griswold; Walter N. Kim; Doreen S. L. Gwin

[57] ABSTRACT

A method of priming a substrate comprising applying to the substrate a blend comprising (a) a modified block copolymer comprising (i) a polystyrene block and (ii) a polydiene block or a hydrogenated polydiene block, the polydiene block or hydrogenated polydiene block being modified to contain an average of one or more carboxyl groups; and (b) a polymer comprising a polymerization reaction product of two or more mono-ethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer; in particular, a method of enhancing adhesion between a substrate and an adhesive comprising the steps of priming the substrate by applying to the substrate the blend and applying the adhesive to the primed substrate.

5 Claims, No Drawings ative to the polydiene block. Examples of compounds which may be

METHODS OF USING ACRYLATE-CONTAINING POLYMER BLENDS

This is a continuation-in-part application of U.S. Ser. No. 08/361,058, filed Dec. 21, 1994 (now abandoned in favor of U.S. Ser. No. 08/589, 198 filed Jan. 22, 1996), which is a continuation-in-part of 08/182,573, filed Jan. 14, 1994, now abandoned.

BACKGROUND OF THE INVENTION

1. Field of the Invention

This invention relates to polymer blends useful, e.g., as adhesives, primers, inks, and paints.

2. Description of the Background Art

Low surface energy substrates such as polyethylene, polypropylene, and other polyolefins are characterized as having critical surface tensions of wetting of about 35 dynes/cm or less. Such surfaces are generally unreceptive to inks, paints, and adhesives due to their poor wettability. There is a need to improve adhesion to such surfaces, as well as to high energy surfaces.

SUMMARY OF THE INVENTION

The present invention relates to a method of priming a substrate comprising applying to the substrate a blend comprising (a) a modified block copolymer comprising (i) a polystyrene block and (ii) a polydiene block or a hydrogenated polydiene block, said polydiene block or hydrogenated polydiene block being modified to contain an average of one or more carboxyl groups; and (b) a polymer comprising a polymerization reaction product of two or more mono-ethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer.

In particular, the present invention also relates to a method of enhancing adhesion between a substrate and an adhesive comprising the steps of priming said substrate by applying to said substrate a blend comprising (a) a modified block copolymer comprising (i) a polystyrene block and (ii) a polydiene block or a hydrogenated polydiene block, said polydiene block or hydrogenated polydiene block being modified to contain an average of one or more carboxyl groups; and (b) a polymer comprising a polymerization reaction product of two or more monoethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer; and applying an adhesive to the primed substrate. In some preferred embodiments, the substrate is a low energy substrate. As used herein, "low energy substrate" refers to a substrate having a critical surface tension of wetting no greater than about 35 dynes/cm. Examples include polyolefin polymers such as polyethylene and polypropylene.

The invention provides polymer blends that exhibit good adhesion to both low energy surfaces (e.g., polyolefins such as polyethylene and polypropylene), as well as higher energy surfaces (i.e., having surface energies greater than 35 dynes/cm such as metal and glass). The blends are useful as primers (e.g., for paints and coatings), adhesives (e.g., for use as tie layers), pressure sensitive adhesives, inks, and paints.

DETAILED DESCRIPTION OF THE INVENTION

The invention features blends comprising a modified block copolymer (a) and an acrylate or methacrylate ester-containing polymer (b) as set forth in the Summary of the Invention section.

The block copolymer comprises one or more polystyrene blocks. If one or two polystyrene blocks are present, the block copolymer can be designated as an AB block copolymer (containing one polystyrene block) and an ABA block copolymer (containing two polystyrene blocks), "A" designating polystyrene and "B" designating polydiene or hydrogenated polydiene.

Examples of a polydiene block or hydrogenated polydiene block include, e.g., a polybutadiene, polyisoprene, ethylene/butylene, or ethylene/propylene block. The term "polydiene" refers to repeating units of a diene monomer. The hydrogenated polydiene block preferably has a residual unsaturation of less than 10%, more preferably less than 5%, based on the original amount of ethylenic unsaturation of the polydiene block. Examples of compounds which may be reacted with the polydiene block or the hydrogenated polydiene block to provide the substituent carboxyl groups include carboxylic acids and anhydrides (e.g., maleic acid and maleic anhydride).

A particularly preferred block copolymer is a maleated styrene-ethylene/butylene-styrene block copolymer. The term "maleated" means that the polydiene or hydrogenated polydiene block is modified, for example, with maleic acid or maleic anhydride so that the polydiene or hydrogenated polydiene block contains an average of one or more carboxyl groups. An example of a preferred polymer is a styrene-ethylene/butylene-styrene triblock copolymer containing 2% by weight succinic anhydride (the source of the carboxyl groups) (commercially available from Shell Chemical Company, Houston, Tex., under the trade designation "Kraton FG-1901X"). "Kraton FG-1901X" has a tensile strength of about 5000 psi, a percent elongation of about 500, a Shore A hardness of about 75, a specific gravity of about 0.91, and a Brookfield viscosity of about 1250 cps at 77° F. (25° C.).

Block copolymer (a) has a ratio, by weight, of polystyrene block to polydiene block or hydrogenated polydiene block typically ranging from about 5:95 to 95:5, more preferably 10:90 to 50:50.

Polymer (b) is the polymerization reaction product of two or more monoethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer.

In addition, polymer (b) may further comprise component (iii), i.e., a monomer having at least one of carboxylic acid functionality, hydroxy functionality, and epoxy functionality or combinations of these monomers. Examples of monomer (iii) includes acrylic acid, methacrylic acid, itaconic acid, 2-hydroxyethyl acrylate, 2-hydroxyethyl methacrylate, glycidyl acrylate, and glycidyl methacrylate. Acrylic and methacrylic acid are preferred. The amount of component (iii), when present, is preferably 1 to 10 parts by weight, more preferably 1 to 5 parts by weight, based on 100 parts by weight of polymer (b). In any case, polymer (b) comprising components (i) and (ii), or (i), (ii), and (iii) is not crosslinked.

The non-tertiary alcohol preferably includes methanol, ethanol, 1-propanol, 2-propanol, 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, or 1-dodecanol. A particularly preferred ester monomer is iso-octyl acrylate.

The nitrogen-containing monomer may comprise an N-vinyllactam (e.g., N-vinylpyrolidone or N-vinylcaprolactam), acrylamide, an N-alkylacrylamide (e.g., N-methylacrylamide), an N,N-dialkylacrylamide (e.g., N,N-dimethylacrylamide), or combinations thereof. The amount of nitrogen-containing monomer depends on the monomer selected. Typically, the amount of nitrogen-containing monomer is at least 2 parts by weight, preferably 5 parts to 40 parts by weight, based on 100 parts by weight of polymer (b). For example, 5 to 30 parts by weight of a nitrogen-containing monomer is preferred when N-vinyllactams and N,N-dimethylacrylamides are used individually. In addition, at least 5 parts by weight of acrylamide is typical when used alone; however, if an N-vinyllactam and acrylamide are used together, the amount of acrylamide used can be less than 5 pans by weight, for example, 1 to 4 parts by weight. The nitrogen-containing monomer of the present invention does not contain acrylic and methacrylic acid ester groups, as in the case of N-vinyllactams, but may contain acrylic or methacrylic acid or derivatives thereof, as in the case of acrylamide, N-alkylacrylamide, or N,N-dialkylacrylamide.

It is believed that the nitrogen-containing monomer enhances the compatibility of the blend through association with the phenyl groups of the styrene blocks and/or the carboxyl groups of the polydiene or hydrogenated polydiene block, resulting in improved properties.

In a preferred embodiment, the homopolymer of the acrylic or methacrylic acid ester has a $T_g$ less than 20° C. A polymeric moiety having a $T_g$ greater than 20° C., a weight average molecular weight above 2,000, and capable of associating with one or more of the blocks of the block copolymer (e.g., a polystyryl moiety as described in Groves, U.S. Pat. No. 5,143,972 entitled "Pressure-Sensitive Adhesive Composition" which is hereby incorporated by reference) may be polymerized with the acrylic or methacrylic acid ester portions of the polymer. In this case, further association is believed to occur between this polymeric moiety and the phenyl groups of the styrene blocks.

Polymer (b) is preferably prepared by free radical-initiated photopolymerization or thermal polymerization of the base monomers using conventional polymerization techniques. The resulting polymer is then physically blended with modified block copolymer (a).

Block copolymer (a) is present in an amount sufficient to allow association with the substrate, particularly if the substrate is a low energy substrate. Polymer (b) is present in an amount sufficient to associate with block copolymer (a). The term "association" or "associate" as used herein with respect to the interaction between a substrate and block copolymer (a) refers to the bonding or contact between the substrate and block copolymer (a) such that the substrate, particularly a low energy substrate, is made more receptive to materials such as inks; paints; and adhesives. That is, block copolymer (a), and ultimately polymer (b) create an energy gradient between the substrate and a higher energy material, for example, an adhesive and/or paint, which is to be bonded to the substrate. The term "association" or "associate" as used herein with respect to polymer (b) and block copolymer (a) refers to the bonding or contact between polymer (b) and block copolymer (a) such that each interacts with the other. The ratio of block copolymer (a) to polymer (b), by weight, preferably ranges from about 95:5 to about 5:95, more preferably from about 75:25 to about 25:75.

Examples of preferred polymer blends include: (1) a blend of maleated styrene-ethylene/butylene-styrene block copolymer and iso-octyl acrylate/N-vinylcaprolactam/acrylic acid polymer; (2) a blend of maleated styrene-ethylene/butylene-styrene block copolymer and iso-octyl acrylate/N-vinylcaprolactam polymer; (3) a blend of maleated styrene-ethylene/butylenestyrene block copolymer and iso-octyl acrylate/N-vinylcaprolactam/acrylic acid/acrylamide/polystyrene macromer polymer; and (4) a blend of maleated styrene-ethylene/butylene-styrene block copolymer and iso-octyl acrylate/acrylamide polymer. The blend may be provided in the form of a primer and/or a paint, ink, or adhesive (e.g., a pressure sensitive adhesive) by using additives, for example, as described below.

As a primer, the polymer blend is particularly useful in the case of low energy substrates. As used herein, "low energy substrate" refers to a substrate having a critical surface tension of wetting no greater than about 35 dynes/cm. Examples include polyolefin polymers such as polyethylene and polypropylene.

The blends can be tackified by incorporating a tackifying agent, modifying the structure of the acrylate or methacrylate ester-containing polymer, or through a combination of both. Tackifiers suitable for tackifying the blends include low molecular weight hydrocarbon resins, and α- and β-pinene based resins. Many tackifiers are commercially available, and optimum selection thereof can be accomplished by one of ordinary skill in the adhesive compounding art. Representative examples of commercially available tackifiers suitable for the blends include the resins available under the trade designations "Regalrez 1018," "Regalfez 1078," and "REZ-D 2084," all of which are available from Hercules Inc., Wilmington, Del.; "Escorez-143H" and "Escorez 5380," both of which are available from Exxon Corp., Houston, Tex.; and "Wingtack Plus," available from Goodyear Tire and Rubber Company, Akron, Ohio. The amount of tackifier included in the blend preferably ranges from about 20 to about 250 parts per hundred parts of the blend. In general lower concentrations of tackifier are used where the blend is in the form of a primer, whereas higher concentrations are used where the blend is in the form of a pressure sensitive adhesive.

The blends may include an anti-oxidant to inhibit oxidation of the tackifying agent and consequent loss of tackiness as the blends age. Suitable anti-oxidants are based on either (1) a hindered phenol or (2) a sulfur-containing organometal salt. Examples of hindered phenols include orthosubstituted or 2,5-disubstituted phenols where the substituent group or groups is a branched hydrocarbon radical having 2 to 30 carbon atoms, e.g., tertiary butyl or tertiary amyl radicals. Other hindered phenols useful in practicing the invention include para-substituted phenols where the substituent groups are $OR^1$, where $R^1$ is methyl, ethyl, 3-substituted propionic ester, etc. Examples of commercially available hindered phenols include those available from Ciba-Geigy Corp., Hawthorne, N.Y., under the trade designation "Irganox 1076" and those available from American Cyanamid Company, Wayne, N.J., under the trade designation "Cyanox LTDP." Suitable sulfur-containing organometal salts are the nickel derivatives of dibutyl dithiocarbamate.

The blends may further include inorganic fillers such as calcium carbonate, clay, talc, silica, and limited amounts of carbon black, as well as organic fillers such as wood flour and starch. Calcium carbonates, clays, and talcs are most commonly used. The blends can also be colored by including dry pigments or color concentrates (usually polystyrene based); coloring is often desired where the blends are in the form of paints or inks. Typical pigments include titanium dioxide and carbon black. Stabilizers such as fungicides and mildewicides can be included as well.

Other additives which may be included in the blends are silanes, titanates, and chlorinated polyolefins ("CPOs"). Furthermore resins such as epoxy resins, may be blended with the block copolymer and acrylate polymer.

The resistance to ultraviolet light degradation of the blends can be enhanced by incorporating ultraviolet inhibitors into the blends. Typically, a 1 part per hundred (phr) loading of the ultraviolet inhibitor having the trade designation "Cyasorb IV 531" (available from American Cyanamid Company, Wayne, N.J.) or a mixture of equal parts of ultraviolet inhibitors having the trade designations "Tinuvin 328" (available from Ciba-Geigy Corp., Hawthorne, N.Y.) and "Uvinal 400" (available from GAF Corp., New York, N.Y.) is sufficient to provide this enhancement. Enhanced results may be achieved from a combination of 0.5 phr of one of the three above-mentioned ultraviolet inhibitors with a nickel chelate having one of the following trade designations: "Cyasorb UV 1084" (0.5 phr) (available from American Cyanamid Company, Wayne, N.J.) or "NBC" (0.1 phr) (available from E. I. du Pont de Nemours and Company, Wilmington, Del.). As used herein, phr is based on the weight of block copolymer in the blend unless otherwise noted.

The above-described blends are particularly useful as primers for adhesives, e.g., pressure sensitive adhesives, thermo setting adhesives, thermoplastic adhesives, and hybrid adhesives. The term "hybrid adhesives" as used herein refers to combinations of two or more different types of adhesives as well as two or more polymers suitable for forming adhesives.

Thermosetting adhesives are generally formed by addition polymerization. Examples of thermosetting adhesives include polysulfides, silicones, polyesters, polyurethanes, epoxies, anaerobic and aerobic acrylics, radiation curable polymers, and vulcanizing rubbers. Thermosetting adhesives typically cure by heat, catalysts, or light or moisture activation. After curing, thermosetting adhesives are generally insoluble, i.e., the adhesive will not dissolved in an organic solvent or water and infusible, i.e., the adhesive will not flow when heated.

Pressure sensitive adhesives generally do not undergo a progressive increase in viscosity after preparation, rather they are permanently in a tacky stage. Examples of pressure sensitive adhesive include those derived from polyacrylates, block copolymers as defined herein, and natural or synthetic rubber. Pressure sensitive adhesives typically possess viscoelastic properties and thus exhibit characteristics of both a viscous liquid and an elastic solid.

Thermoplastic adhesives are soluble and fusible materials. Examples of thermoplastic adhesives include vinyl adhesives, e.g., polyvinyl chloride, polyvinyl butyral, polyvinyl alkyl esters and ethers, and vinyl-acetate-ethylene copolymer adhesives; acrylic adhesives; hot melt adhesives; cellulosic adhesives; and asphalt adhesives. Thermoplastic adhesives may be in the form of emulsions, solutions, or solids.

A primer of the present invention may be applied using a variety of techniques including dipping, spraying, brushing, rotogravure, Meier rod, and knife coating. One particularly useful application technique involves applying a primer of the present invention to the substrate and then abrading. This technique effects chemical reactions induced by mechanical actions like abrading, i.e., mechanochemistry. Suitable abrasive products include a lint-free tissue, cloth, or sandpaper. When sandpaper is used, it is preferably wet or dry and 50% of the abrasive grit size preferably ranges from 100 to 2 microns. When pressure sensitive adhesives are being bonded to a substrate, preferably the abrasive grit size ranges from 8 to 2 microns, most preferably from 5.5 to 2.0 microns. When structural adhesives, i.e., epoxies and polyurethanes, are being bonded to a substrate, preferably the abrasive grit size ranges from 100 to 50 microns.

The following non-limiting examples further illustrate the present invention. All percentages are in percentage by weight unless indicated otherwise.

EXAMPLES

TEST METHODS

A. PRIMERS

FPL Process For Etching Aluminum

Aluminum specimens (typically 152.4 mm×50.8 mm×1.6 mm specimens, (available from Vincent Metals, Minneapolis, Minn., under the trade designation "2024-T3 Alclad") are treated according to the etching process described in H. W. Eichner, Forest Products Laboratory; Report No. 1842, Apr. 1, 1954, Madison, Wis., USA. Specifically, the specimens are treated as follows. Each specimen is rinsed in acetone and then allowed to air dry. Next, each specimen is degreased by soaking for 10 minutes in 75 g of Oakite 164 (alkaline detergent) per liter of distilled water. Each specimen is then rinsed for 2 minutes in tap water, followed by immersion for 10 minutes at 71° C. in an etching bath consisting of 1161 g of $H_2SO_4$, 156.8 g of $Na_2Cr_2O_7 2H_2O$, 1.5 g of 202H-T3 bare aluminum alloy chips, and enough distilled water to make 3.5 liters of solution. Following immersion in the etching solution, each specimen is rinsed for 2 minutes with tap water and dried for 10 minutes at 66° C.

Static Shear

The shear strength of primed and unprimed substrates bonded to double-coated, pressure sensitive adhesive foam tapes or pressure sensitive transfer adhesives is determined according to the following procedure.

An FPL-etched aluminum strip (available from Vincent Metals, Minneapolis, Minn., under the trade designation "2024 -T3 Alclad") measuring 50.8 mm×25.4 mm×1.6 mm with a 7 mm diameter hole on center and 10 mm from one edge of the strip is prepared. Likewise, similar strips of the primed and unprimed substrate, each having a thickness that does not yield at the test temperature under the testing load, are prepared.

A 12.7 mm wide pressure sensitive adhesive tape carried on a release liner is adhered to the solid end of the aluminum strip (i.e., the end opposite the end with the hole) and trimmed to a length of 25.4 mm. The liner is then removed and the solid end of the substrate strip adhered to the exposed adhesive surface. The resulting specimen is placed in a horizontal position and rolled down with a 2.4 kg roller to insure intimate contact between the surfaces. After being kept at room temperature for 24 hours the specimen is placed in an air circulating oven preheated to 80° C. After 15 minutes, a 1 kg weight is hung from the specimen. The specimen is tilted 2° from the vertical in order to negate any peel forces. The time it takes for the weight to fall (in minutes) is the "static shear value". If no failure occurs after 6,000 minutes, the test is discontinued.

90° Peel Adhesion- Pressure Sensitive Adhesive

Peel adhesions (N/100 mm) of double-coated pressure sensitive foam tapes to various primed and unprimed substrates are determined in the following manner.

The matted side of a 114 mm×15.9 mm×0.13 mm piece of aluminum foil (1145-0-SB, Lawrence Fredrick Company, Greenwood, Ill.) is placed on the linerless side of a foam tape sample carried on a release liner measuring 101.6 mm×12.5 mm×1.1 min. A 2.4 kg hard rubber-covered steel roller is then passed back and forth three times over the specimen.

Next, about 50 mm of the liner is cut from the linered side of the sample, and the sample is then placed and centered near one end of a 152.4 mm×50.8 mm×5.1 mm plaque of the primed or unprimed substrate. A 2.4 kg hard rubber-covered roller is again passed back and forth three times over the assembled specimen. The procedure is then repeated to laminate a second foam tape-aluminum construction to the other end of the plaque.

After dwelling for the specified length of time at ambient temperature, the specimen is placed in a 90° peel fixture (PJ-90, Consultants INTL. Network, Mentor, Ohio) and mounted in an Instron tensile tester (available from Instron Corp., Canton, Mass.). The 90° peel adhesion is measured by removing the free end of the aluminum foil-laminated foam tape at a rate of 30.5 cm per minute. The reported peel strengths (in N/100 mm) are an average of three determinations.

90° Peel Adhesion—Thermosetting Adhesive

Peel adhesions (N/100 mm) of films of polypropylene (PP) and low density polyethylene (LDPE) bonded with thermosetting adhesives are determined in the following manner.

A film sample, 175 mm×75 mm×0.25 mm, was secured to a flat surface using a 0.25 mm acrylic pressure sensitive transfer adhesive (available from Minnesota Mining and Manufacturing Company, St. Paul, Minn. under the trade designation "F9473PC"). The surface of the sample was flooded with a primer solution and evenly abraded with a piece of 80 micron grit, fabric backed abrasive (available from Minnesota Mining and Manufacturing Company, St. Paul, Minn. under the trade designation "3M-ITE P220"). After one minute, the surface was flooded again with primer solution and abraded for an additional one minute. The film sample was washed three times each with xylene and ethanol and dried under ambient conditions for 24 hours. A 0.5 mm layer of a two-part epoxy adhesive (available from Minnesota Mining and Manufacturing Company, St. Paul, Minn. under the trade designation "Scotch-Weld 2216 B/A") was applied to a 152.4 m×101.6 mm×1.6 mm FPL-etched 2024-T3 aluminum panel. The primed side of the film was bonded to the adhesive using pressure from a light rubber-covered roller. After 72 hours, the film was slit into three 12.5 mm test specimens. The aluminum panel was placed in a 90° peel fixture (available from Consultant INTL Network, Mentor, Ohio) and mounted in an Instron tensile tester (available from Instron Corp., Canton, Mass.). The 90° peel adhesion was measured by removing the free end of the film strips at a rate of 30.5 cm per minute. A control sample was prepared in the same manner except the sample was not flooded with primer solution and the sample was abraded in the absence of a primer solution. The reported peel strengths (N/100 mm) are an average of three determinations.

Cohesive Strength

The cohesive strengths of commercially available foam tapes were determined according to the procedure of the 90° peel adhesive test, except that the tapes were bonded to a 152.4 mm×50.8 mm×1.6 mm, FPL-Etched 2024-T3 aluminum panel and allowed to dwell for 2 hours prior to testing. The foam tapes were foam tapes available from Minnesota Mining and Manufacturing Company, St. Paul, Minn., under the trade designation "Scotch" in conjunction with the following designations "Y-4220", "VHB-4205", and "VHB-4950" (double coated with acrylic pressure sensitive adhesives); "VHB-4952" (double-coated with a styrene-butadiene rubber (SBR) pressure sensitive adhesive); and "VHB-4910" (1 mm thick acrylic transfer tape). All foam tapes failed by cohesive failure of the foam core. The results shown in Table A are an average of three values for each tape. These values are used as benchmarks for the semi-quantitative peel adhesion test described below.

TABLE A

| Tape Type | Adhesive Type | Cohesive Failure (N/100 mm) |
| --- | --- | --- |
| "Y-4220" | Acrylic | 438 |
| "VHB-4205" | Acrylic | 1050 |
| "VHB-4952" | SBR | 658 |
| "VHB-4910" | Acrylic | 702 |
| "VHB-4950" | Acrylic | 877 |

Semi-Quantitative Peel Adhesion

The level of adhesion of primed and unprimed substrates to pressure sensitive adhesives which cannot be determined quantitatively (e.g., where the substrate is a thin and/or flexible film or a predimensioned rigid article) are determined semi-quantitatively. Sample preparation is carried out according to the 90° peel adhesion procedure except that two or more foam tapes are used and the tape-aluminum foil laminate is secured to the substrate with hand pressure or a 2.4 kg rubber-covered steel roller. After dwelling for a specified time (typically 15 minutes), the free end of the tape-aluminum foil laminate is pulled from the substrate by hand. If cohesive failure of the foam core is not observed, a foam tape having the next lowest cohesive strength (determined with reference to Table A, above) is bonded and then removed. This procedure is repeated with successive foam tapes (with reference to Table A, above) until cohesive failure of the foam core occurs. A semi-quantitative level of adhesion of the primed substrate to the pressure sensitive adhesive of the foam tape is then determined with reference to Table A.

Single Overlap Shear

Two substrate plaques, each measuring 51 mm×25.4 mm×5 mm, are cleaned twice with a heptane-saturated soft tissue and then rinsed with ethanol. After 15 minutes, the primer solution is applied to one side of each of the plaques using a cotton-tipped applicator and allowed to dry for 30 minutes. Two drops of ethyl cyanoacrylate adhesive (available from Minnesota Mining and Manufacturing Company, St. Paul, Minn., under the trade designation "Pronto CA-40") are then placed on one of the primed surfaces. Next, the remaining primed substrate plaque is placed on top of the cyanaoacrylate-containing plaque to form a 12.7 mm overlap joint. Finger-tight pressure is maintained over the joint for about 0.5 minutes. Three test assemblies are prepared for each measurement and allowed to cure for 72 hours prior to testing. Joint strength is measured in an Instron tensile tester (available from Instron Corp., Canton, Mass.) at a crosshead speed of 1.47 mm/min.

B. PRESSURE SENSITIVE ADHESIVES

The test methods used to evaluate the parameters of flexible sheet materials coated with pressure sensitive adhesive compositions according to the invention are standard industrial tests. The standard tests are described in detail in various publications of the American Society for Testing and Materials (ASTM), Philadelphia, Pa. and the Pressure Sensitive Tape Council (PSTC), Glenview, Ill. The standard test methods are described in detail below. The reference source of each of the standard test methods is also given.

Shear Strength

Reference: ASTM:D3654-78; PSTC-7

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive-coated sheet material from a stainless steel test panel under stress of a constant, standard load.

The tests are conducted on adhesive coated strips applied to a stainless steel panel such that a 12.5 mm by 12.5 mm portion of each strip is in firm contact with the panel, with one end portion of the tape being free. The panel with coated strip attached is held in a rack such that the panel forms an angle of 178° with the extended free end of the tape which is then tensioned by application of a force of one kilogram applied as a hanging weight from the free end of the coated strip. The 2° less than 180° is used to negate any peel forces, thereby insuring that only the sheer forces are measured in an attempt to more accurately determine the holding power of the tape being tested. The time elapsed for each tape example to separate from the test panel (in minutes) is recorded as the shear strength.

180° Peel Adhesion

Reference: ASTM: D3330–78; PSTC-1 (11/76)

Peel adhesion is the force required to remove a coated flexible sheet material from a test panel measured at a specific angle and rate of removal. In the examples, this force is expressed in Newtons per 100 mm (N/100 mm) width of coated sheet. The measurement procedure is as follows.

(1) A 12.5 mm width of coated sheet is applied to the horizontal surface of a clean glass test plate with at least 12.7 lineal cm in firm contact. A hard rubber roller is used to apply the strip.

(2) The free end of the coated strip is doubled back nearly touching itself so the angle of removal will be 180°. The free end is attached to the adhesion tester scale.

(3) The glass test plate is clamped in the jaws of a tensile testing machine which is capable of moving the plate away from the scale at a constant rate of 2.3 meters per minute.

(4) The scale reading in Newtons is recorded as the tape is peeled from the glass surface. The data is reported as the range of numbers observed during the test.

Inherent Viscosity

The inherent viscosity is measured by conventional means using a Cannon-Fenske #50 viscometer in a water bath controlled at 25° C. to measure the flow time of 10 ml of polymer solution (0.15 g of polymer per deciliter of ethyl acetate). The examples and control examples being run for comparison were run under identical conditions.

A. PRIMERS

EXAMPLE 1

This example illustrates one preferred blend according to the invention useful as a primer.

Preparation of Block Copolymer Solution

A 25% solution of block copolymer was prepared by dissolving 25.0 g of styrene-ethylene/butylene-styrene triblock copolymer containing 2% bound succinic anhydride (available from Shell Chemical Company, Houston, Tex., under the trade designation "Kraton FG-1901X") and 0.25 g of antioxidant (available from Ciba-Geigy Corp., Hawthorne, N.Y., under the trade designation "Irganox 1076") in 75.0 g of a solvent mixture of cyclohexane, xylene, and ethanol in a weight ratio of 5.5:3.5:1.0.

Preparation of Acrylate Ester Polymer

A terpolymer consisting of iso-octyl acrylate/N-vinylcaprolactam/acrylic acid (IOA/NVC/AA) in a weight ratio of 78:20:2 was prepared as follows.

To a 237 ml narrow-mouthed bottle were added 39 g of IOA, 10 g of NVC, 1 g of AA, 0.1 g azobisisobutyronitrile (available under the trade designation "VAZO-64," from E. I. du Pont de Nemours & Company, Wilmington, Del.), 52.5 g of ethyl acetate, 9.0 g of methyl isoamyl ketone, and 13.5 g of xylene. The resulting solution was purged with dry argon for three minutes and sealed. The sealed bottle was then tumbled in a rotating water bath at 55° C. for 24 hours. The percentage of conversion was determined to be 99.1% by infrared spectrophotometric analysis. The solution contained 40% solids and had a viscosity of about 7500 cps. The inherent viscosity was determined to be about 0.72 dl/g.

Preparation of Blend

A blend of the block copolymer and acrylate ester polymer in a 1:3 weight ratio at a total solids concentration of 3.0% was prepared by dissolving 1.0 g of the block copolymer solution prepared as described above and 1.9 g of the acrylate ester polymer solution prepared as described above in 30.4 g of a solvent blend of cyclohexane, xylene, and ethanol in a weight ratio of 5.5:3.5:1.0.

EXAMPLES 2–12

In a like manner, blends of the block copolymer prepared as described in Example 1 and various acrylate ester polymers were prepared in a 1:3 weight ratio. The identities of the acrylate ester polymers are set forth in Table 1, below.

TABLE I

| Example | Polymer Composition |
|---|---|
| 2 | IOA/NVC/AA (88/10/2) |
| 3 | IOA/NVC/AA (83/15/2) |
| 4 | IOA/NVC/AA (93/5/2) |
| 5 | IOA/NVP/AA/ACM/PSM (71/20/1/1/7)[1] |
| 6 | IOA/ACM (95/5) |
| 7 | IOA/NVC (95/5) |
| 8 | IOA/NVC (90/10) |
| 9 | IOA/NVC (85/15) |
| 10 | IOA/NVC (80/20) |
| 11 | IOA/DMACM/AA (78/20/2)[2] |

[1] ACM is acrylamide. PSM is 2-polystyrylethyl methacrylate (weight average molecular weight about 10,000 g/mol, prepared according to U.S. Pat. No. 4,554,324; 52% solids in cyclohexane). NVP is N-vinylpyrrolidone.
[2] DMACM is N,N-dimethylaceylamide.

The blends prepared according to examples 1–11 were applied by brush to 152 mm×51 mm×5 mm plaques of low density polyethylene (LDPE), polypropylene (PP) (both available from Precision Punch and Plastics, Minneapolis, Minn.), and a thermoplastic polyolefin (TPO) (available from Himont USA, Inc., Lansing, Mich., under the trade designation "ETA 3163"). After 10 minutes, aluminum foil-laminated foam pressure sensitive adhesive tape samples (1 mm thick acrylic pressure sensitive adhesive foam tape available from Minnesota Mining and Manufacturing Company, St. Paul, Minn., under the trade designation "VHB -4205") were bonded to the primed areas as described in the Test Method for 90° peel adhesion. After one hour, 90° peel values were determined; the values are reported in Table II as an average of three measurements. Control peel values were also determined for unprimed plaques. The results are shown in Table III.

TABLE II

| | 90° Peel Values (N/100 mm) | | |
|---|---|---|---|
| Example | LDPE | PP | TPO |
| Control | 26.0 | 26.0 | 17.5 |
| 1 | 158.0 | 281.0 | 754.0* |
| 2 | 158.0 | 281.0 | 667.0 |
| 3 | 158.0 | 281.0 | 719.0* |
| 4 | 158.0 | 263.0 | 210.0 |
| 5 | 158.0 | 491.0 | 754.0* |
| 6 | 175.0 | 315.0 | 631.0 |
| 7 | 175.0 | 123.0 | 88.0 |
| 8 | 175.0 | 333.0 | 421.0 |
| 9 | 175.0 | 316.0 | 561.0 |
| 10 | 175.0 | 316.0 | 719.0* |
| 11 | 125.0 | 614.0 | 772.0* |

*Cohesive failure of the foam core

The results in Table II demonstrate that using blends according to the invention to prime low energy surfaces improve the adhesion of pressure sensitive adhesives to the surfaces.

EXAMPLE 12

The block copolymer solution prepared according to Example 1 and the acrylate ester polymer prepared according to Example 5 were each diluted to 3% polymer solids using a solvent blend of cyclohexane, xylene, and ethanol in a weight ratio of 5.5:3.5:1.0, and applied by brush to polypropylene (PP) and low density polyethylene (LDPE) test plaques as described above. Peel values were determined as described above and compared to the values for the block copolymer/acrylate ester polymer blend prepared according to Example 5 and reported in Table II. The results are shown in Table III.

TABLE III

| | 90° Peel Values (N/100 mm) | |
|---|---|---|
| | LDPE | PP |
| Block Copolymer | 88.0 | 88.0 |
| Acrylate Ester Polymer | 24.0 | 70.0 |
| Example 5 Blend | 158.0 | 491.0 |

The results in Table III demonstrate that while the individual blend components, when used alone, do not perform well as primers, high peel adhesions are obtained when they are blended together.

EXAMPLE 13

Blends containing the block copolymer prepared as in Example 1 and the acrylate ester polymer of Example 5 were prepared in weight ratios of 1:3, 1:1, and 3:1, diluted to 3% polymer solids, and brushed on test plaques of thermoplastic polyolefin (TPO) as described above. Peel values were determined using tape "VHB-4205" as described in Example 1; the results are shown in Table IV.

TABLE IV

| Blend Ratio | 90° Peel (N/100 mm) |
|---|---|
| 1:3 | 702* |
| 1:1 | 684* |
| 3:1 | 702* |

*cohesive failure of the foam core

The results in Table IV demonstrate that a wide variety of block copolymer/acrylate ester polymer ratios yield effective primer compositions for low energy surfaces.

EXAMPLE 14

The blend prepared according to Example 10 was applied to polypropylene (PP) and low density polyethylene (LDPE) test plaques using a lint-free tissue. After 10 minutes, aluminum foil-laminated foam tape were bonded to the primed substrates. In particular, the following tapes were used: double coated acrylic pressure sensitive adhesive foam tape (available from Minnesota Mining and Manufacturing Company, St. Paul, Minn., under the trade designation "VHB-4205"); 1 mm thick acrylic transfer pressure sensitive adhesive tape (available from Minnesota Mining and Manufacturing Company, St. Paul, Minn., under the trade designation "VHB-4910"); double coated styrene-butadiene rubber pressure sensitive adhesive foam tape (available from Minnesota Mining and Manufacturing Company, St. Paul, Minn., under the trade designation "VHB-4952"). After one hour, 90° peel values were determined; values for unprimed substrates were determined as well. The results are reported in Table V.

TABLE V

| | 90° Peel Values (N/100 mm) | |
|---|---|---|
| | PP | LDPE |
| Unprimed | | |
| "VHB-4205" | 26.0 | 26.0 |
| "VHB-4910" | 52.0 | 26.0 |
| "VHB-4952" | 298.0 | 210.0 |
| Primed | | |
| "VHB-4205" | 350.0 | 772.0* |

TABLE V-continued

| | 90° Peel Values (N/100 mm) | |
|---|---|---|
| | PP | LDPE |
| "VHB-4910" | 210.0 | 439.0 |
| "VHB-4952" | 421.0 | 702.0* |

*cohesive failure of the foam core

The results in Table V demonstrate that the use of a blend according to the invention as a primer improves the peel adhesion of both acrylic and styrene butadiene rubber (SBR) pressure sensitive adhesives to low energy surfaces.

EXAMPLE 15

About 109 g of a 3% primer solution prepared according to Example 1 was modified by the addition of 0.5 g of epoxy resin (available from Shell Chemical Company, Houston, Tex., under the trade designation "Epon 828"), 3.0 g of chlorinated polypropylene (available from Eastman Chemical Company, Kingsport, Tenn. under the trade designation "CP 343-3"), 0.5 g of silane coupling agent (available from OSi Specialties, Danbury, Conn., under the trade designation "Silquest A 186"), and 0.8 g of triethanolamine titanate (available from E. I. du Pont de Nemours & Company, Wilmington, Del. under the trade designation "Tyzor TE"). About 25 g of this solution was diluted to 1% solids by the addition of 109 g of a solvent mixture of cyclohexane, xylene, and ethanol in a weight ratio of 5.5:3.5:1.0. The primer solution was brushed on test plaques of glass, aluminum (Al), and stainless steel (S.S.). After 10 minutes, aluminum foil-laminated tapes (available from Minnesota Mining and Manufacturing Company, ST. Paul, Minn. under the trade designations "VHB-4205", "VHB-4910", and "VHB-4952") were bonded to the primed samples. After 72 hours, 90° peel values were determined; the results are recorded in Table VI.

COMPARATIVE EXAMPLE 15

The procedure of Example 15 was followed except that the glass, aluminum, and stainless steel test plaques were primed with a commercially available chlorinated polypropylene primer (available from Norton Performance Plastics, Granville, N.Y., under the trade designation "Tite-R-Bond-2684"). The results are shown in Table VI.

TABLE VI

| | 90° Peel Values (N/100 mm) | | |
|---|---|---|---|
| Primer Solutions | Glass | Al | S.S. |
| Unprimed | | | |
| "VHB-4205" | 386 | 684* | 315 |
| "VHB-4910" | 263 | 140 | 210 |
| "VHB-4952" | 386 | 386 | 351 |
| Example 15 | | | |
| "VHB-4205" | 701* | 701* | 772* |
| "VHB-4910" | 649 | 439 | 368 |
| "VHB-4952" | 614 | 649* | 561 |
| Comparative Example 15 | | | |
| "VHB-4205" | 32 | 351 | 35 |
| "VHB-4910" | 26 | 351 | 17 |
| "VHB-4952" | 456 | 491 | 26 |

*cohesive failure of the foam core

Table VI demonstrates that the primer solution of this invention improves the adhesion of both acrylic and styrene butadiene rubber (SBR) pressure sensitive adhesives to substrates of high surface energy (e.g., glass, stainless steel, and aluminum).

EXAMPLE 16

A 1% primer solution prepared according to Example 15 was applied to low density polyethylene (LDPE) and polypropylene (PP) test plaques with a lintless tissue (available from Kimberly-Clark Corp., Roswell, Ga., under the trade designation "Kimwipe"). After 10 minutes, aluminum foil-laminated tapes (available from Minnesota Mining and Manufacturing Company, St. Paul, Minn. under the trade designations "VHB-4205", "VHB-4910", and "VHB-4952") were bonded to the primed samples as previously described. After one hour the peel values were determined; the results are set forth in Table VII.

COMPARATIVE EXAMPLE 16

The procedure of Example 16 was followed except that the LDPE and PP test plaques were primed with a commercially available chlorinated polypropylene primer (available from Norton Performance Plastics, Granville, N.Y., under the trade designation "Tite-R-Bond-2684"). The results are shown in Table VII.

TABLE VII

| | 90° Peel Values (N/100 mm) | |
|---|---|---|
| | LDPE | PP |
| Unprimed | | |
| "VHB-4205" | 26 | 26 |
| "VHB-4910" | 26 | 52 |
| "VHB-4952" | 210 | 298 |
| Example 16 | | |
| "VHB-4205" | 789* | 824* |
| "VHB-4910" | 596 | 421 |
| "VHB-4952" | 702* | 526 |
| Comparative Example 16 | | |
| "VHB-4205" | 298 | 473 |
| "VHB-4910" | 140 | 351 |
| "VHB-4952" | 351 | 403 |

*cohesive failure of the foam core

Table VII demonstrates that the primer solution of Example 16 improves the adhesion of both acrylic and styrene butadiene rubber (SBR) pressure sensitive adhesives to substrates of low surface energy.

EXAMPLE 17

A 1% primer solution prepared according to Example 15 was brushed on mm×75 mm×0.25 mm specimens of linear low density polyethylene film (LLDPE) (available from Consolidated Thermoplastics Company, Schaumburg, Ill.). After 15 minutes, aluminum foil-laminated foam tape samples (available from Minnesota, Mining and Manufacturing, St. Paul, Minn., under the trade designations "VHB-4220" and "VHB-4205") were bonded to the primed samples. After one hour, semi-quantitative peel adhesions were measured by attempting to remove the tapes by hand. Samples of "VHB-4220" could not be removed due to cohesive failure of the foam core. This indicated peel adhesion values of at least 425 N/100 mm had been achieved.

Although excellent adhesion of the "VHB-4205" foam tape was observed, it could be removed from the primed LLDPE without cohesive foam failure. After 12 hours, cohesive foam failure was observed, indicating that a peel value of about 1000 N/100 mm had been achieved.

COMPARATIVE EXAMPLE 17

The procedure of Example 17 was followed except that a commercially available chlorinated polypropylene primer (available from Norton Performance Plastics, Granville, N.Y., under the trade designation "Tite-R-Bond 2684") was brushed on the LLDPE specimens. After 15 minutes, foam tape (available from Minnesota Mining and Manufacturing Company, St. Paul, Minn., under the trade designation "VHB-4220") was bonded to the samples. After intervals of both one and twelve hours, the tape could easily be removed by hand. Peel values were estimated to be only about 90 N/100 mm or less.

EXAMPLE 18

A 1% primer solution prepared according to Example 15 was brushed on two 125 mm×75 mm×0.25 mm specimens of LLDPE film following the procedure of Example 17. The primed specimens were then allowed to dry for 15 minutes and 24 hours, respectively. Next, the primed samples were painted with a latex semi-gloss interior enamel (available from The Glidden Company, Cleveland, Ohio), an interior/exterior oil-based high gloss enamel (available from Carver Tripp, Parks Corp. Somerset, Mass.), and an aerosol polyurethane lacquer (available from Minnesota Mining and Manufacturing Company, St. Paul, Minn., under the designation Part NO-05904). In a like manner, unprimed specimens of LLDPE film were also painted. After drying under ambient conditions for 24 hours, 125 mm×75 mm×0.25 mm samples of filament tape (available from Minnesota Mining and Manufacturing Company, St. Paul, Minn., under the trade designation "Scotch Brand 898") were firmly bonded to each painted surface (primed and unprimed). After 15 minutes, the tape was quickly removed from each specimen. Complete delamination of all paints to the unprimed LLDPE films was observed. No delamination of paint was observed from any of the primed LLDPE surfaces.

COMPARATIVE EXAMPLE 18

The procedure of Example 18 was followed except that a commercially available chlorinated polypropylene primer (available from Norton Performance Plastics, Granville, N.Y., under the trade designation "Tite-R-Bond 2684") was brushed on LLDPE specimens. The primed specimens were painted and tested as described in Example 18. Complete delamination of all paints to the primed film was observed.

EXAMPLE 19

To 10 g of a 3% primer solution prepared according to Example 15 was added 1 g of titanium dioxide dispersion (available from Hüls America Inc., Piscataway, N.J., under the trade designation "GPD 82-0082"). Likewise, to another 10 g of the same primer solution was added 1 g of carbon black dispersion (available from Borden Chemical Company, Cincinnati, Ohio, under the trade designation "Codispersion 31L62"). After mixing, both pigmented solutions were brushed on untreated LLDPE film and allowed to dry at ambient conditions for 24 hours. The peel adhesion values of the pigmented coatings to LLDPE film were determined by firmly bonding filament tape (available from Minnesota Mining and Manufacturing Company, St. Paul, Minn., under the trade designation "Scotch Brand 898") to the coated surfaces in the manner previously described in Example 18. No delamination of either coating was observed when the tape was rapidly removed.

This example demonstrates that compositions according to the invention can be utilized to prepare coatings, inks, and paints that adhere well to low energy polymer surfaces.

EXAMPLE 20

A 1% primer solution prepared according to Example 15 was brushed on 50.8 mm×24.4 mm×5.1 mm test plaques of thermoplastic polyolefin (TPO) (commercially available from Himont USA Inc., Lansing, Mich., under the trade designation "ETA 3163") and tested for static shear to FPL etched 2024-T3 aluminum at 80° C. under a 1.0 kg load utilizing foam tape (available from Minnesota Mining and Manufacturing Company, St. Paul, Minn., under trade designation "VHB-4210"). Unprimed thermoplastic olefin (TPO) specimens were also tested. The results are reported in Table VIII.

TABLE VIII

| Primer | Static Shear Value (min.) |
| --- | --- |
| None | 300 |
| Example 15 | 10,000 + |

The results in Table VIII demonstrate that the primer solutions of the invention improve the high temperature holding power of an acrylic pressure sensitive adhesive to substrates of low surface energy.

EXAMPLE 21

A 3% primer solution prepared according to Example 15 was brushed on both sides of a 150 mm×150 mm×0.10 mm specimen of clear, flexible polyvinyl chloride (PVC) film (available from Wiman Plastic Div., St. Cloud, Minn.) and a 150 mm×150 mm×0.35 mm specimen of unpigmented, opaque thermoplastic polyolefin (TPO) film (available from Himont USA Inc., Lansing, Mich., under the trade designation "HIFAX CA10A") and allowed to dry for 30 minutes. A 0.25 mm acrylic pressure sensitive transfer adhesive carried on a removable liner (available from Minnesota Mining and Manufacturing Company, St. Paul, Minn., under the designation "F 9473 PC") was laminated to one side of each of the films with a 2.4 kg hard rubber roller. Likewise, 126 mm×12.5 mm of the same adhesive was laminated to 130 mm×15.9 mm×0.13 mm strips of aluminum foil with a 2.4 kg hard rubber roller.

The peel values of the transfer adhesive to the primed tape backings were then determined by laminating a 150 mm×51 mm sample of each transfer tape/backing construction to 152 mm×51 mm×1.6 mm FPL etched, 2024-T3 aluminum plates with a 2.4 kg rubber roller. About 75 mm of liner was removed from the aluminum foil-laminated transfer adhesive samples and bonded to each of the tape samples on the aluminum plate in a manner such that two test samples for each tape were prepared. The resulting samples had the following construction: aluminum plate/transfer adhesive/primed backing (both sides)/transfer adhesive/aluminum foil. Unprimed control samples were prepared in a similar manner. The peel values are reported in Table IX.

TABLE IX

| | Peel Values (N/100 mm) |
|---|---|
| Unprimed | |
| PVC | 175 |
| TPO | 7 |
| Primed | |
| PVC | 702* |
| TPO | 702* |

*adhesive and film failure

This example illustrates that pressure sensitive adhesive tapes having holding power to backing equivalent to the cohesive strength of the adhesive or the tensile or yield strength of the backing can be prepared.

EXAMPLE 22

Plaques measuring 51 mm×25.4 mm×5 mm of polypropylene (PP) and high density polyethylene (HDPE) (available from Precision Punch & Plastics, Minneapolis, Minn.) were cleaned with heptane and rinsed with ethanol. After 15 minutes a 1% primer solution prepared according to Example 15 was applied to one side of each of the plaques using a cotton-tipped applicator. The primed plaques were then bonded together with ethyl cyanoacrylate adhesive and the overlap joint strengths determined. The results are reported in Table X.

TABLE X

| Substrate | Overlap Joint Strength (N/mm²) |
|---|---|
| HDPE | 2.5 |
| PP | 4.6 |

This example illustrates that the primer solutions of the invention initiate the polymerization of ethyl cyanoacrylate adhesives to give high bond strengths between substrates of low surface energy.

EXAMPLE 23

A construction using a thermosetting adhesive was prepared as described under 90 Peel Adhesion—Thermosetting Adhesive test method. The 5% solution set forth in Table XI was used.

TABLE XI

| Component | Amount (g) |
|---|---|
| solvent mixture of cyclohexane, xylene, and ethanol in a weight ratio of 5.5:3.5:10 | 30 |
| styrene block copolymer (available from Shell Chemical Company, Houston, TX under the trade designation "FG 1901X") | 0.23 |
| chlorinated polypropylene (available from Eastman Chemical, Kingsport, TN under the trade designation "CP 343-3") | 0.92 |
| epoxy resin (available from Shell Chemical COmpany, Houston, TX, under the trade designation "Epon 828") | 0.15 |
| epoxy silane coupling agent (available from OSi Specialties Inc., Danbury, CT, under the trade desgination "Silquest A 186") | 0.15 |
| iso-octyl acrylate/N-vinylcaprolactam/acrylic acid polymer in a weight ratio of 78:21:1 (40% solids) | 1.8 |
| triethanolamine titanate (available from E. I. du Pont de Nemours & Company, Wilmington, DE, under the trade designation "Tyzor TE") | 0.07 |

The surface of the sample was initially flooded with about 1.5 ml of the solution and abraded according to the test method described above. The control sample was abraded in the absence of primer solution. The results are set forth in Table XII.

TABLE XII

| | 90° Peel Values (N/100 mm) | |
|---|---|---|
| Solution | LDPE | PP |
| Control | 17.5 | 14.0 |
| Example 23 | 163.0 | 502* |

*film failure, i.e., the strength of the film was exceeded and the film has changed dimensions The 90° peel values were dramatically increased by using a solution in accordance with the present invention as compared to an unprimed substrate.

EXAMPLE 24

Thermoplastic polyolefin plaques, 51 mm×25.4 mm×5 mm, (available from Himont USA, Inc., Lansing, Mich., under the trade designation "ETA 3163") were cleaned twice with ethanol and allowed to dry. A 5% solution prepared according to Example 23 was brushed on one side of each of the plaques and allowed to dry for 24 hours.

The primed plaques were bonded with two-part epoxy adhesives (available from Minnesota Mining and Manufacturing Company, St. Paul, Minn., under the trade designation "Scotch-Weld 2216 B/A") to form 25.4 mm×12.7 mm overlap joint. The samples were allowed to cure for 72 hours under a weight of 150 g. A control sample was prepared without using any primer solution. Joint strengths (N/mm²) were measured in an Instron tensile tester (available from Instron Corp., Canton, Mass.) at a crosshead speed of 12.7 mm per minute. The values reported in Table XIII are an average of three determinations for Example 24 and a single determination for the control sample

TABLE XIII

| Solution | Overlap Joint Strength (N/mm²) TPO |
|---|---|
| Control | 0.34 |
| Example 24 | 1.65 |

B. PRESSURE SENSITIVE ADHESIVES

EXAMPLE 25

This example illustrates one preferred blend according to the invention useful as a pressure sensitive adhesive.

The following ingredients in the amounts shown were introduced into a one liter jar.

| Ingredient | Amount (g) |
|---|---|
| Maleated styrene-ethylene/butylene-styrene elastomer (available from Shell Chemical Company, Houston, TX, under the trade designation "Kraton FG 1901X") | 100 |
| Tackifier (available from Hercules Inc., Wilmington, DE, under the trade designation "Regalrez 1018") | 75 |
| Tackifier (available from Hercules Inc., Wilmington, DE, under the trade designation "Rez-D 2084") | 75 |
| Tackifier (available from Hercules Inc., Wilmington, DE, under the trade designation "Regalrez 1078") | 25 |

-continued

| Ingredient | Amount (g) |
| --- | --- |
| Antioxidant (available from Ciba-Geigy Corp., Hawthorne, NY, under the trade designation "Irganox 1076") | 1 |
| Antioxidant (available from American Cyanamid Company, Wayne, NJ, under the trade designation "Cyanox LTDP") | 1 |
| Ultraviolet inhibitor (available from Ciba-Geigy Corp., Hawthorne, NY, under the trade designation "Tinuvin 328") | 0.3 |
| Ultraviolet inhibitor (available from GAF Corp., New York, NY, under the trade designation "Unvinal 400") | 0.3 |
| Toluene | 323 |
| Ethanol | 16.5 |

The jar was shaken until the ingredients dissolved to give a solution containing about 45% total solids and a viscosity of about 1300 cps (as measured by a Brookfield viscometer, Model HAT, Spindle No. 4, Speed 50 rpm). The solution is referred to herein as the "block copolymer."

43.3 g of the block copolymer was introduced into a 118 ml jar along with 26.2 g of an iso-octyl acrylate/acrylamide (IOA/ACM) copolymer prepared according to Example 6. The blend was stirred vigorously until it was homogeneous. The jar was capped and heated at 65° C. for about one hour. The blend was then stirred vigorously and allowed to stand overnight. The blend contained 65% by weight of the block copolymer and 35% by weight of the IOA/ACM copolymer. After mild agitation, the blend was coated onto oriented polyethylene terephthalate film having 0.025 mm thickness by means of a laboratory 52 mm knife coater at a knife setting of about 0.25 mm. The coated film was air dried at 95° C. for 15 minutes to give an average coating weight of about 6.0 mg/cm$^2$. Samples were prepared according to Test Methods previously described and tested for peel adhesion to glass, low density polyethylene (LDPE), polypropylene (PP), and stainless steel (SS) surfaces, and shear strength. The results are shown in Table XIV.

TABLE XIV

| Adhesive | Peel Value (N/100 mm) | | | | Shear(min.) |
| --- | --- | --- | --- | --- | --- |
| | Glass | LDPE | PP | SS | |
| Example 23 | 68 | 29 | 52.5 | 61 | 220 |

The results of Table XIV demonstrate that useful pressure sensitive adhesives can be prepared from blends according to the invention.

C. TIE LAYERS

EXAMPLE 26

A blend was prepared by combining 15 g of the block copolymer solution described in Example 1 and 30 g of the acrylate ester polymer described in Example 1. The blend was combined with 1 g of epoxy resin (available from Shell Chemical Company, Houston, Tex., under the trade designation "Epon 828"), 3.0 g of chlorinated polypropylene (available from Eastman Chemical Company, Kingsport, Tenn. under the trade designation "CP 343-3"), 2.5 g of silane coupling agent (available from OSi Specialties, Danbury, Conn., under the trade designation "Silquest A 186"), 4 g of triethanolamine titanate (available from E. I. du Pont de Nemours & Company, Wilmington, Del. under the trade designation "Tyzor TE") and 99 g of a solvent mixture of cyclohexane, xylene, and ethanol in a weight ratio of 5.5:3.5:1.0 to prepare about an 18% solution.

This solution was cast onto the non-matted side of three 152.4 mm×24.5 mm×1.3 mm aluminum strips (available from Lawrence Fredrick Company, Greenwood, Ill.). A 0.25 mm thick coating of the solution dried to form about a 0.037 mm thick coating of adhesive on each strip.

A 3% primer solution prepared as described in Example 15 was brushed onto three 152.4 mm×24.5 mm×2.5 mm plaques of thermoplastic olefin (TPO), (available from Himont USA, Inc., Lansing, Mich., under the designation "ETA 3095") and allowed to dry. The adhesive-coated aluminum strips were laminated to about 137 mm of the primed TPO plaques at a temperature of 200° C. for 15, 30, and 45 seconds, respectively, under low pressure. Peel values were determined to be 175.4 N/100 mm, 245.6 N/100 mm, and 265 N/100 mm, respectively.

This example illustrates the utility of the compositions of this invention as adhesive tie layers for laminating dissimilar materials together.

What is claimed is:

1. A method of enhancing adhesion between a substrate and an adhesive comprising the steps of:

priming said substrate by applying to said substrate a blend comprising
   (a) a block copolymer comprising
      (i) a polystyrene block and
      (ii) a polydiene block or a hydrogenated polydiene block, said polydiene block or hydrogenated polydiene block containing an average of one or more carboxyl groups; and
   (b) a polymer comprising a polymerization reaction product of two or more mono-ethylenically unsaturated monomers in which:
      (i) at least one of the monomers is an acrylic or methacrylic acid ester of a non-tertiary alcohol having 1 to 14 carbon atoms, inclusive, and
      (ii) at least one of the monomers is a nitrogen-containing monomer selected from the group consisting of an N-vinyllactam and an N,N-dialkylacrylamide; and applying an adhesive to the primed substrate.

2. The method of claim 1 wherein said substrate comprises a low energy substrate.

3. The method of claim 1 wherein said adhesive is selected from the group consisting of pressure-sensitive adhesives, thermosetting adhesives, thermoplastic adhesives, and hybrid adhesives.

4. A method of priming a substrate comprising applying to the substrate a blend comprising
   (a) a block copolymer comprising
      (i) a polystyrene block and
      (ii) a polydiene block or a hydrogenated polydiene block, said polydiene block or hydrogenated polydiene block containing an average of one or more carboxyl groups; and
   (b) a polymer comprising a polymerization reaction product of two or more mono-ethylenically unsaturated monomers in which:
      (i) at least one of the monomers is an acrylic or methacrylic acid ester of a non-tertiary alcohol having 1 to 14 carbon atoms, inclusive, and
      (ii) at least one of the monomers is a nitrogen-containing monomer selected from the group consisting of an N-vinyllactam and an N,N-dialkylacrylamide.

5. A method of priming a substrate comprising applying to the substrate a blend comprising a maleated styrene-ethylene/butylene styrene block copolymer and an iso-octyl acrylate/N-vinylcaprolactam/acrylic acid polymer.

* * * * *

UNITED STATES PATENT AND TRADEMARK OFFICE
CERTIFICATE OF CORRECTION

PATENT NO. : 5,602,202
DATED : February 11, 1997
INVENTOR(S) : James D. Groves

It is certified that error appears in the above-identified patent and that said Letters Patent is hereby corrected as shown below:

Column 3,
Line 7, "N,vinylpyrolidone" should read --N,vinylpyrrolidone--
Line 21, "pans" should read --parts--

Column 4,
Line 34, "Regalfez 1078" should read --Regalrez 1078--

Column 5,
Line 5, "of ten" should read --often--
Line 34, "thermo setting" should read --thermosetting--

Column 11,
Line 16, "N,N-dimethylaceylamide" should read --N,N-dimethylacrylamide--

Column 14,
Line 56, "on mm x 75" should read --on 125 mm x 75--

Column 17,
Line 57, "COmpany" should read --Company--
Line 62, "desgination" should read --designation--

Column 19,
Line 29, "52 mm" should read -- 152 mm--

Signed and Sealed this

Seventh Day of August, 2001

*Attest:*

*Attesting Officer*

NICHOLAS P. GODICI
*Acting Director of the United States Patent and Trademark Office*